Inventor
Bernard Kern.
By Milans & Milans
Attorneys

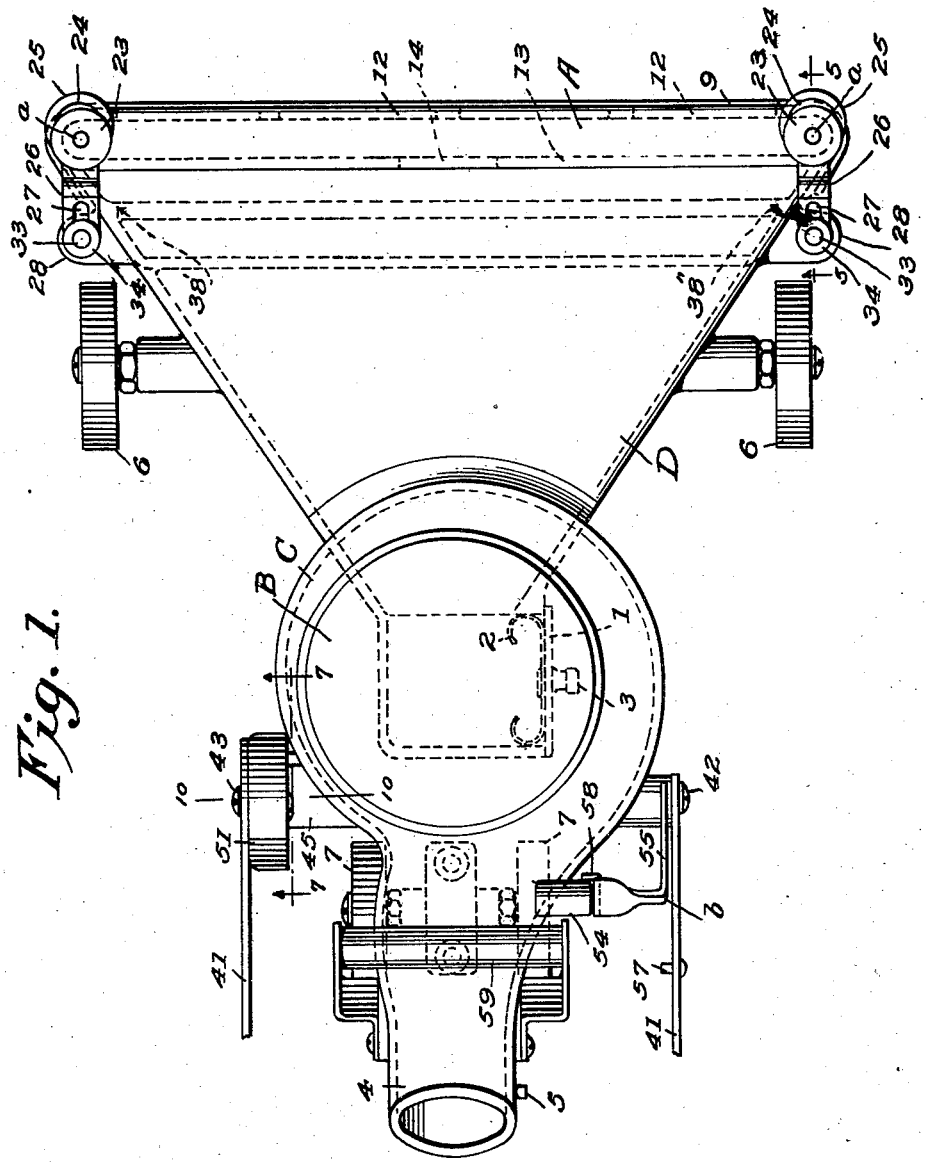

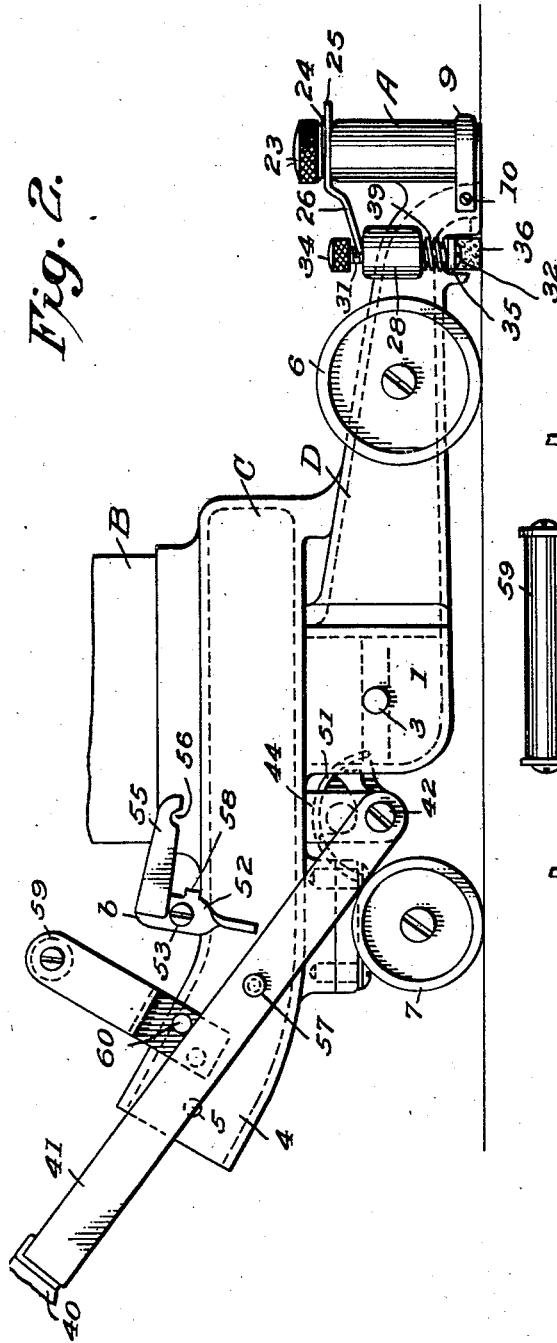

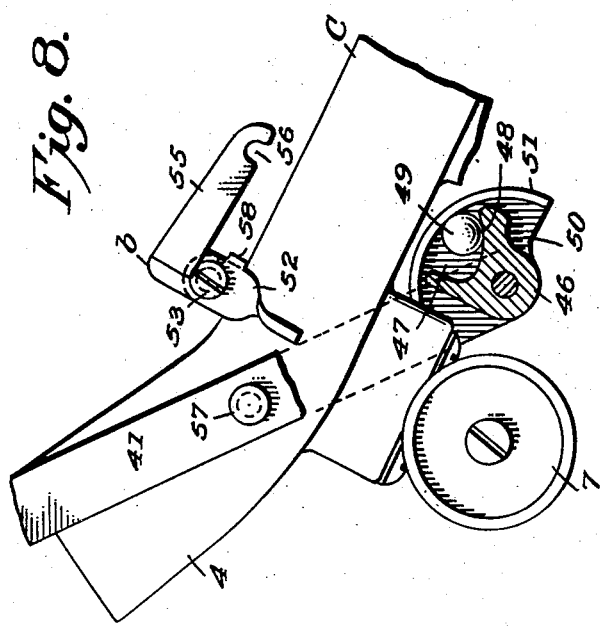
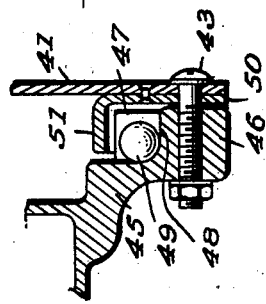
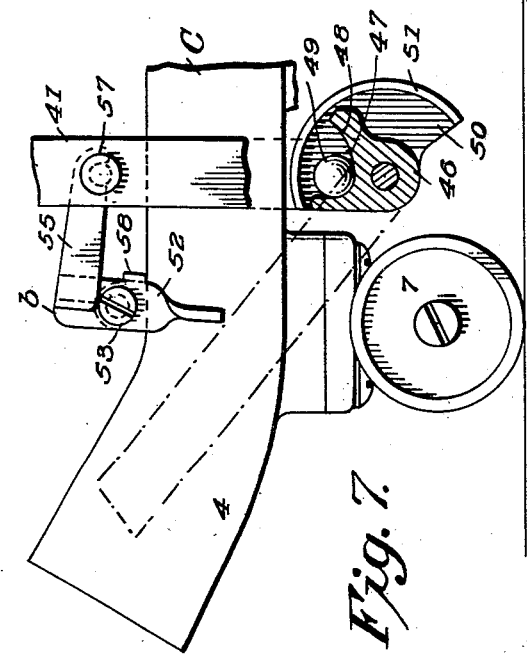
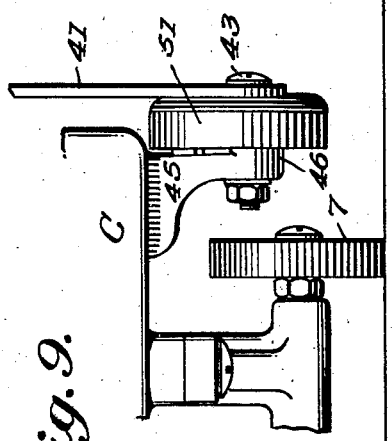

Patented Nov. 30, 1937

2,100,806

UNITED STATES PATENT OFFICE 2,100,806

CARPET AND FLOOR CLEANER

Bernard Kern, Syracuse, N. Y.

Application October 18, 1933, Serial No. 694,151

4 Claims. (Cl. 15—155)

My invention relates to new and useful improvements in carpet and floor cleaners of the suction or vacuum type and has for its principal object the provision of a machine of the character described which is relatively simple and inexpensive in construction, relatively light in weight whereby it may be easily manipulated and moved from place to place and which is efficient and effective in its operation.

Another object of the invention consists in the provision of a machine of the character described including a nozzle formed with a chamber adjacent one edge of the mouth portion thereof in which is positioned a floor pad, means being provided for raising and lowering the pad whereby it may be engaged with the floor or positioned out of contact therewith.

A further object of the invention resides in the provision of an auxiliary pad positioned adjacent one edge portion of the nozzle, which may be referred to as a lint or litter rolling pad, this auxiliary pad being normally urged downwardly into engagement with the carpet or other surface being cleaned but adapted to be raised into inoperative position by means controlled by the adjusting mechanism or means for the floor pad positioned within the chamber of the nozzle.

Still another object of the invention consists in so forming the nozzle and associated parts that air currents, controlled by the fan forming a part of the cleaner, are properly directed into engagement with the surface being cleaned and then conducted through a conduit for depositing the dust or other matter into a bag or other suitable receptacle, provided for such purpose, the formation of the nozzle permitting operation of the cleaner with great efficiency with the utilization of a fan of relatively small size.

As a further object of the invention I provide novel means whereby the cleaner may be raised from the surface being cleaned and supported or held by the operating handle at a angle, cooperating parts being provided on the body of the cleaner and handle whereby the body of the cleaner may be held at an angle relative to the handle and relative to the surface being cleaned.

Still another object of the invention resides in the provision of a novel form of latch whereby the operating handle may be held in a vertical position adapting the cleaner to be carried from place to place.

With the above and other objects in view, which will appear as the description proceeds, my invention consists in the novel details of construction and arrangement of parts illustrated in the accompanying drawings and described in the following specification, and while I have illustrated and described the preferred embodiments of the invention, as they now appear to me, it will be understood that such changes may be made as will fall within the scope of the appended claims.

In the drawings:—

Fig. 1 is a top plan.

Fig. 2 is a side elevation.

Fig. 3 is a front elevation.

Fig. 7 is a section on the line 7—7 of Fig. 1 looking in the direction of the arrows with the body portion of the cleaner in normally horizontal working position.

Fig. 8 is a section on the same line as Fig. 7 with the body portion of the cleaner shown in inclined position or in position slightly raised from the surface being cleaned.

Fig. 9 is a fragmental detail of the clutch connection between the handle and body portion of the cleaner; and Fig. 10 is a section on the line 10—10 of Fig. 1.

Figure 4:
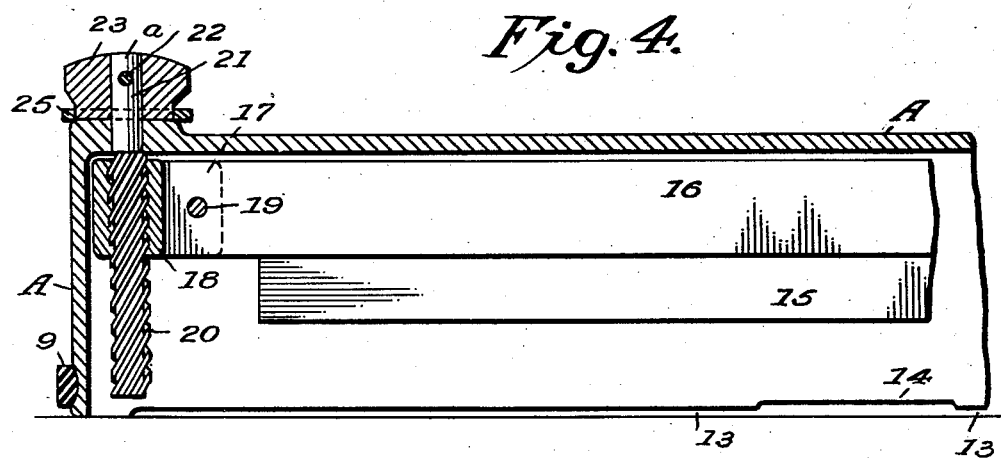
Fig. 4 is a fragmental longitudinal section through the pad chamber of the nozzle with parts shown in elevation.

In the drawings A denotes generally a chamber formed adjacent one edge of the mouth portion of a nozzle, B the motor casing, C the fan housing, and D the conduit leading from the nozzle to the fan housing C, an opening being formed at the side of the conduit at its rear end and normally closed by means of a removable plate 1 having on its inner face the retaining spring 2 and on its outer face a knob or handhold 3. Leading from the fan housing C is the extension 4 to which a dust bag, not shown, may be connected in the usual manner, a projection 5 being provided on the extension 4 to be received in a slot formed in a thimble carried by the dust bag or in other words to cooperate with the slot in the thimble of the dust bag to provide a bayonette connection between the extension and dust bag in the well-known manner.

The cleaner as a whole is adapted to be normally supported by the pair of front wheels 6 and the pair of rear wheels 7.

The chamber A is provided, in its front face or wall, and around its ends, adjacent the bottom edge with a groove 8 in which is received a band 9 of rubber, felt or similar material, which prevents marring of furniture, walls, or the like which may be engaged while operating the cleaner and the ends of the band are secured in position by means of the screws 10 or other suitable fastenings. The bottom edge of the front face or wall of the chamber A is cut away at 11, as shown more particularly in Fig. 3 of the drawings, this cut-out portion 11 terminating a distance from the ends of the chamber. Above the cut-out portion 11 I provide, in the front face or wall of the chamber, the elongated openings 12 which, as shown more particularly in Figs. 5 and 6 of the drawings, are directed downwardly at an angle for a purpose which will be later brought out. The rear face or wall of the chamber A, as shown more particularly in Fig. 4 of the drawings, has its bottom edge cut away as shown at 13 with an additional cut-out portion 14 intermediate the ends of the cut-out portions 13. As shown the cut-out portions 13 terminate short of the ends of the wall the same as is the case with the cut-out portion 11 in the front face or wall. With the construction which has just been described it will be seen that the ends of the chamber normally rest on the surface being cleaned and the cut-out portions 11 and 13 permit the passage of air currents beneath the chamber and the extra or additional cut-out portion 14, in the rear face or wall of the chamber, permits rolled threads or other matter to readily pass beneath the rear wall and into the conduit D. When the fan in the housing C, not shown, is operated air will be drawn through the cut-out portion 11, of the front face or wall of the chamber, into the chamber and an additional air supply or currents enter through the downwardly directed openings 12 and are directed onto the surface being cleaned. The currents are then drawn, by the operation of the fan, through the cut-out portions 13 and 14 in the rear face or wall of the chamber and into the conduit D. With the construction of chamber just described the same is normally in contact with the surface being cleaned and when used for cleaning a rug, carpet or the like the carpet or rug is not drawn upwardly from the floor but air currents entering through the openings 12 are directed to the nap of the rug or carpet to thoroughly clean the same.

Positioned and operable in the chamber A is a floor pad 15 of felt, sponge rubber, or other suitable material and the upper edge of this floor pad is supported between a pair of metal plates 16, as shown more particularly in Fig. 4 of the drawings, the ends of the plates 16 projecting beyond the ends of the pad, as shown more particularly in Fig. 4 and received between the arms 17 carried by the internally threaded sleeves 18. The ends of the plates 16 are secured to the arms 17, by means of the rivets, screws, or bolts indicated generally at 19. Extending through the top of the chamber A and positioned adjacent opposite ends thereof are the vertically extending rods a having the threaded portion 20 and the unthreaded portion 21, the threaded portions of these rods a being received in the threaded bores of the sleeves 18 as shown more particularly in Figs. 4, 5 and 6 of the drawings. Secured to the unthreaded portions of each of the rods a, by means of a transversely extending pin 22 or other suitable fastening is a knob 23 having the eccentric portion 24 received and operable in an opening formed in a plate 25 having a downwardly extending arm 26 with its end forked as shown at 27.

Figure 5:
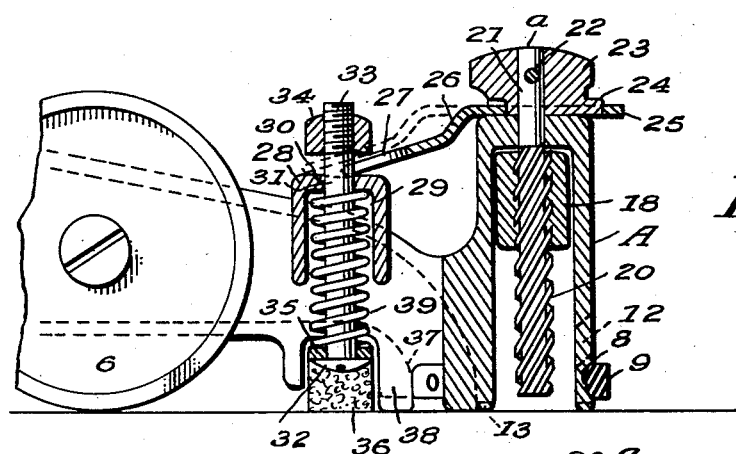
Fig. 5 is a section on the line 5—5 of Fig. 1 looking in the direction of the arrows with the floor pad shown in raised position.
Figure 6:
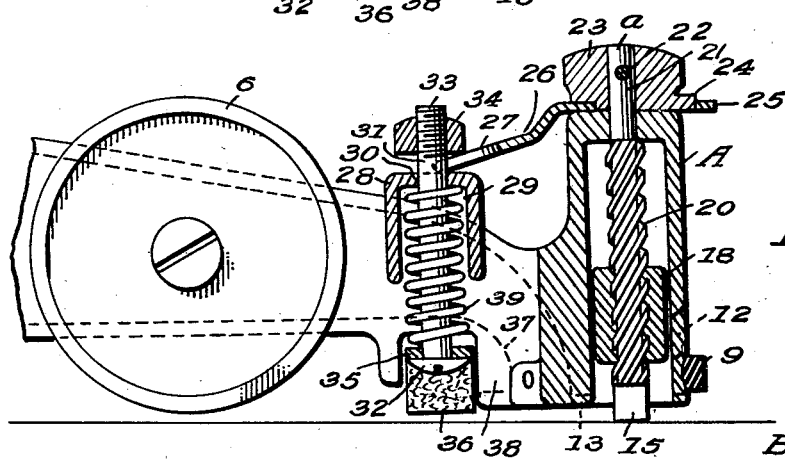
Fig. 6 is a view similar to Fig. 5 showing the floor pad in lowered position.

Extending from opposite sides of the conduit D, adjacent its forward end, are the lugs or projections 28 having the recesses 29 extending inwardly from the bottom, as shown more particularly in Figs. 5 and 6 of the drawings. Extending through the upper surface of the lugs or projections 28, and communicating with the recesses 29, are the openings 30 through which extend the bolts 31 provided at their lower ends with a head 32 and at their upper ends with the threads 33 to receive the nuts 34. It will be understood that these bolts 31 have free sliding movement within the openings 30 and the forked ends 27 of the depending portions 26 of the plates 25 engage and operate over the upper surfaces of the lugs or projections 28 with the arms of the forked ends straddling the bolts 31 as shown and extending beneath the nuts 34 for the purpose which will be later brought out. Carried by the bolts 31 and supported by the heads 32 thereof is a plate 35 to which is secured a pad 36 of sponge rubber or other suitable material and it will be seen that the ends of the plate 35 project beyond the ends of the pad 36 to provide space for the bolts 31. This pad 36 is more particularly adapted for removing threads, lint or the like from a carpet or rug and as the sweeper is operated has a tendency to roll the threads or lint so that the same may be readily drawn into the inlet opening 37 of the conduit D. A wall 38 is formed between the inlet opening of the conduit and the pad 36 and the bottom edge of this wall is cut away or recessed between the points 38' and 38" shown in Fig. 1 of the drawings so that the threads, lint or dirt, may pass beneath the wall and into the conduit passage as the sweeper is operated. Surrounding each of the bolts 31, and positioned between the plate 35 and the inner walls of the recesses 29 of the lugs or projections 28 is a coiled spring 39 which will normally urge the pad 36 downwardly into engagement with the surface being cleaned.

When the sweeper is being used for cleaning carpets or rugs the floor pad 15 will be raised in the chamber A as shown more particularly in Figs. 4 and 5 of the drawings and the pad 36 will be in its lowermost position for engagement with the surface being cleaned. Thus as the sweeper is operated over the rug or carpet any threads, lint or the like will be removed by the pad 36 and rolled so that it may be readily drawn into the inlet opening of the conduit D. Dust ladened air from the nozzle is also drawn into the conduit for deposit into the dust bag. When it is desired that the pad 36 be not used the knobs 23 are given a one-half turn so that the eccentrics 24 will slide the plates 25 with the forked extensions 26 into the position shown in dotted lines in Fig. 5 and the forked ends 27 engaging the nuts 34 will raise the bolts 31 against the action of the coiled springs 39 and thus raise the pad 36. The pitch of the threads 26 of the rods a are such that when the knobs 23 are given a one-half turn, as described, the pad 15 will only be lowered to a mid-way position within the chamber A but when the knobs 23 are given a complete turn the pad 15 will be lowered into the position shown in Fig. 6 of the drawings and the chamber or forward end of the cleaner will be supported in the raised position shown in Fig. 6. When in this position the pad 36 will not contact with the surface being cleaned. The pad 15 is primarily intended for cleaning bare floors as distinguished from those covered by carpets or rugs and in passing over the surface of the floor the pad will loosen any smudge or the like so that it may be drawn into the conduit. It will be seen that by operating the knobs 23 the pad 15 may be raised and lowered and that this rotation of the knobs also controls the position of the pad 36.

For operating and carrying the cleaner or sweeper I provide a handle, a portion of which is shown at 40 secured to the yoke 41, the arms of which are pivotally connected at 42 and 43 to the members 44 and 45 depending from the bottom of the fan housing C. The member 45 has an outwardly directed portion 46 provided in its upper surface with the recess 47 having the inclined surface 48. Received in the recess 47 is a ball 49 which is normally in the position shown in Fig. 7 of the drawings when the cleaner is in horizontal position. The arm of the yoke 41, adjacent the member 45 has secured to its inner face a plate 50 provided with an inwardly directed flange 51 which overlies the recess 47 of the extension or portion 46 as well as the ball 49. When the sweeper or cleaner is in horizontal position with the ball 49 positioned in the recess, as shown in Figs. 7 and 10 of the drawings, the ball will be out of engagement with the flange 51. At times it is desired to temporarily raise the sweeper or cleaner from the surface being cleaned such as when the cleaner or sweeper passes off the edge of the rug or carpet and when it is desired to draw the sweeper or cleaner back over the edge into position for cleaning. It will be understood that at such time the handle extends at an angle from the body portion of the sweeper or cleaner and when the same is raised the body portion of the sweeper or cleaner will drop into inclined position shown more particularly in Fig. 8 of the drawings. As the body portion of the sweeper or cleaner drops into the inclined position shown in Fig. 8 the ball 49 will pass over the inclined surface 48 and contact with the flange 51 which, through frictional engagement, holds the body portion of the sweeper or cleaner from dropping further. When thus held in the position shown in Fig. 8 the sweeper or cleaner may be moved into the position desired. The formation shown more particularly in Figs. 7 to 10 inclusive acts as a clutch between the body portion of the sweeper or cleaner and the handle and associated yoke 41.

When the sweeper is not in use or when it is desired to carry the same from place to place the handle 40 and its associated yoke 41 are raised into the vertical position shown more particularly in Fig. 7 of the drawings and in order to hold the same in this vertical position I provide the latch indicated generally at b which includes the arm 52 pivotally connected at 53 to the upwardly extending projection 54 carried by the fan housing C and the arm 55 having its lower edge provided with the notch 56 adapted to receive the pin 57 carried by the arm of the yoke 41. As the handle 40 and yoke 41 are raised into vertical position the pin 57 will engage the bottom edge of the arm 55 until it reaches the notch 56 which engages and holds the same. When it is desired to release the latch the lower end of the portion 52 is engaged to swing the latch on the pivot 53 and raise the arm 55 to release the pin 57 from the recess 56. For limiting the downward movement of the arm 55 the arm 52 is provided with the inwardly extending projection 58 which engages the face of the projection 54 as shown.

To aid in the operation of the sweeper or cleaner under certain conditions or to aid in carrying the same from place to place or positioning the same on the surface to be cleaned I provide the auxiliary handle or hand grip indicated at 59 the arms of this handle or hand grip being secured to the extension 4 of the fan housing C by means of the rivets 60 or other suitable fastenings.

From the above detailed description it is thought that the construction and operation of my improved form of cleaner will be clearly understood. It will be seen that I have provided a nozzle formed with a chamber which will normally rest directly upon the surface being cleaned except when the floor pad is in lowered position at which time the pad supports the chamber or forward end of the cleaner or sweeper in raised position. The cleaner is also formed so that the greatest amount of efficiency is obtained from a relatively small motor such as is ordinarily used with devices of the character described and in which the air currents entering the nozzle or chamber are directed against the surface being cleaned so as to loosen the dust or other matter from the surface and direct the same into the conduit which leads to the dust bag or other receptacle. I have also provided the two different pads, one of which is primarily intended for cleaning floors such as those not ordinarly covered by carpets or rugs, and the other is primarily intended for loosening threads or lint from carpets or rugs and rolling the same so that it may be readily drawn into the air conduit. The two different pads are operated from the same knobs as has been quite clearly brought out. Further I have provided a novel form of clutch for supporting the body portion of the cleaner or sweeper in inclined position relative to the handle, the clutch permitting the cleaner or sweeper to be temporarily raised from the surface being cleaned such as when drawing the same back over the edge of a carpet or rug over which the sweeper or cleaner has been run.

Having fully described my invention what I claim as new and desire to secure by Letters Patent is:—

1. A machine of the character described including a nozzle formed with a chamber adjacent one edge of the mouth portion thereof, a pad positioned in the chamber, a second pad positioned adjacent the opposite edge of the mouth portion, means for normally urging the second mentioned pad towards and into contact with the surface being cleaned, and common adjusting means for the two pads, said means when in one position of adjustment moving the first mentioned pad to a midway position in the chamber while raising the second mentioned pad out of contact with the surface being cleaned, and when in a final position of adjustment lowering the first mentioned pad into contact with the surface being cleaned and raising the nozzle to a position above the surface.

2. A machine of the character described including a nozzle formed with a chamber adjacent one edge of the mouth portion thereof, a pad positioned in the chamber, a second pad positioned adjacent the opposite edge of the mouth portion, means for normally urging the second mentioned pad towards and into contact with the surface being cleaned, and common adjusting means for the two pads, said means when in normal position holding the first mentioned pad in raised position in the chamber and permitting engagement of the second mentioned pad with the surface being cleaned, when in one position of adjustment moving the first mentioned pad to a midway position in the chamber while raising the second mentioned pad out of contact with the surface being cleaned, and when in a final position of adjustment lowering the first mentioned pad into contact with the surface being cleaned and raising the nozzle to a position above the surface.

3. A machine of the character described including a nozzle formed with a chamber adjacent one edge of the mouth portion thereof, a pad positioned in the chamber, a second pad positioned adjacent the opposite edge of the mouth portion, means for normally urging the second mentioned pad towards and into contact with the surface being cleaned, means including an eccentric for adjusting the first mentioned pad in the chamber and relative to the surface being cleaned, and means operable by the eccentric for raising the second mentioned pad out of contact with the surface being cleaned, said first mentioned pad adjusting means when in normal position holding the pad in raised position in the chamber and permitting contact of the second mentioned pad with the surface being cleaned, when in one position of adjustment moving the first mentioned pad to a midway position in the chamber while raising the second mentioned pad out of contact with the surface being cleaned, and when in a final position of adjustment lowering the first mentioned pad into contact with the surface being cleaned and raising the nozzle to a position above the surface.

4. A machine of the character described including a nozzle formed with a chamber adjacent one edge of the mouth portion thereof, a pad positioned in the chamber, a second pad positioned adjacent the opposite edge of the mouth portion, means for normally urging the second mentioned pad towards and into contact with the surface being cleaned, means including an eccentric for adjusting the first mentioned pad in the chamber and relative to the surface being cleaned, and a plate operable for raising the second mentioned pad out of contact with the surface being cleaned, the plate having an opening therein to receive the eccentric and to be moved thereby to adjust the second mentioned pad, said first mentioned pad adjusting means when in normal position holding the pad in raised position in the chamber and permitting contact of the second mentioned pad with the surface being cleaned, when in one position of adjustment moving the first mentioned pad to a midway position in the chamber while raising the second mentioned pad out of contact with the surface by means of operation of the plate, and when in a final position of adjustment lowering the first mentioned pad into contact with the surface being cleaned and raising the nozzle to a position above the surface.

BERNARD KERN.